United States Patent
Smith et al.

(10) Patent No.: US 9,551,387 B2
(45) Date of Patent: Jan. 24, 2017

(54) DISC BRAKE ASSEMBLY WITH GUIDE PIN LOCATING FEATURE

(71) Applicant: Kelsey-Hayes Company, Livonia, MI (US)

(72) Inventors: Daniel A. Smith, Livonia, MI (US); Antonio Eduardo Morais, South Lyon, MI (US); Sky Lintner, Ypsilanti, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 14/615,506

(22) Filed: Feb. 6, 2015

(65) Prior Publication Data

US 2016/0230823 A1 Aug. 11, 2016

(51) Int. Cl.
*F16D 65/14* (2006.01)
*F16D 55/2265* (2006.01)
*F16D 55/227* (2006.01)

(52) U.S. Cl.
CPC ....... *F16D 55/22655* (2013.01); *F16D 55/227* (2013.01)

(58) Field of Classification Search
CPC ............... F16D 55/227; F16D 55/2265; F16D 55/22655; F16G 15/06
USPC .......................................... 188/73.44, 73.45
See application file for complete search history.

(56) References Cited

U.S. PATENT DOCUMENTS

| | | | |
|---|---|---|---|
| 4,084,666 A * | 4/1978 | Karasudani | F16D 55/2265 188/73.45 |
| RE30,255 E | 4/1980 | Rath et al. | |
| 4,334,599 A * | 6/1982 | Ritsema | F16D 55/22655 188/73.45 |
| 4,684,280 A * | 8/1987 | Dirkin | F16G 15/06 403/153 |
| 4,741,419 A | 5/1988 | Rath | |
| 4,921,077 A * | 5/1990 | Klimt | F16D 55/227 188/370 |
| 5,323,882 A | 6/1994 | Waterman et al. | |
| 5,526,904 A * | 6/1996 | Walden | F16D 55/227 188/73.44 |
| 5,657,837 A * | 8/1997 | Yamadera | F16D 55/227 188/73.42 |
| 5,931,267 A * | 8/1999 | Iwata | F16D 55/22655 188/73.44 |

(Continued)

FOREIGN PATENT DOCUMENTS

EP 2256361 A1 12/2010

OTHER PUBLICATIONS

PCT International Search Report and Written Opinion, Application No. PCT/US2016/016561, dated May 16, 2016.

*Primary Examiner* — Christopher Schwartz
(74) *Attorney, Agent, or Firm* — MacMillan, Sobanski & Todd, LLC (57) ABSTRACT

A vehicle disc brake assembly comprises a brake caliper and an anchor bracket. The brake caliper has a lug, a bore, an opening, a fastener, and a guide pin. The lug has first and second side faces. The bore extends from the first side face to the second side face. The opening is to the bore at the first side face. The fastener has a transition portion between a bolt stem and a bolt head. The transition portion is fitted to the opening. The guide pin is attached to the fastener. The anchor bracket is supported on the guide pin.

19 Claims, 11 Drawing Sheets

(56) References Cited

U.S. PATENT DOCUMENTS

| | | | |
|---|---|---|---|
| 6,540,050 B2* | 4/2003 | Kuroyanagi | F16D 55/227 |
| | | | 188/73.45 |
| 7,455,471 B2* | 11/2008 | Gawehn | F16B 5/025 |
| | | | 16/2.1 |
| 2007/0051568 A1 | 3/2007 | Barbosa et al. | |
| 2008/0128223 A1 | 6/2008 | Dit Cordier et al. | |
| 2014/0231191 A1* | 8/2014 | Morais | F16D 65/0062 |
| | | | 188/73.31 |

* cited by examiner

DISC BRAKE ASSEMBLY WITH GUIDE PIN LOCATING FEATURE

BACKGROUND OF INVENTION

This invention relates in general to vehicle disc brake assemblies and in particular to an improved guide pin locating feature adapted for use in such a vehicle disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

Typical disc brake assemblies include a rotor which is secured to the wheel of the vehicle for rotation therewith. The rotor includes a pair of opposed friction plates which are selectively engaged by portions of a caliper assembly. The caliper is slidably supported on an anchor bracket by guide pins. The guide pins are secured to the caliper by guide pin fasteners and contact the anchor bracket at contact points. In turn, the guide pin fasteners are secured in caliper bores. The anchor bracket creates a contact load on each of the guide pins at the contact points.

The anchor bracket is attached to a non-rotatable component of the vehicle, such as the vehicle frame. The caliper assembly includes a pair of brake shoes which are disposed on opposite sides of the brake rotor. The brake shoes are connected to one or more hydraulically or pneumatically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The braking position produces a torque force on the brake assembly. The torque force results from the brake shoes and caliper in the braking position being dragged by the rotor. The torque force causes anchor bracket deflection and brake caliper translation. Anchor bracket deflection occurs when the brake shoes and caliper in the braking position are dragged by the rotor and the brake pads contact an abutment of the brake caliper. The brake pads contacting the abutment causes the anchor bracket to deflect—i.e., the anchor bracket rotates about an attachment point between the anchor bracket and the non-rotatable component of the vehicle. The torque force produces a moment around a mounting bolt securing the anchor bracket to a stationary component of the vehicle. The anchor bracket deflection and the mounting bolt moment results in joint slippage for the fasteners.

Additionally, the deflection and/or translation may increase the contact load between the anchor bracket and the pins sufficiently to bind the guide pins against the anchor bracket. Binding reduces the ability of the caliper to slide and move the brake shoes between the non-braking and braking positions.

It is known to those skilled in the art that the guide pins may be tapered to prevent joint loosening. Joint slippage and loosening are distinct. Joint slippage is when the joint maintains the original clamp load but displaces. Joint loosening is when the original clamp load is reduced, with or without joint displacement. For example, a through bolt may be holding two plates together. If the through bolt shifts within holes through the plates or the plates shift relative to each other, but there is no reduction in the clamping force of the bolt, then there is joint slippage without joint loosening.

Furthermore, the guide pins may be tapered to control an insertion depth of the guide pin into the anchor bracket, as in U.S. Patent Publication No. 2007/0051568.

Thus, it would be desirable to have an improved guide pin locating/mounting feature which reduced bracket translation and caliper deflection.

SUMMARY OF INVENTION

This invention relates to a brake caliper support assembly for use in a vehicle disc brake assembly.

According to one embodiment, a disc brake assembly may comprise, individually and/or in combination, one or more of the following features: a brake caliper having a lug, a bore, a fastener, and a guide pin. The lug has first and second side faces. The bore extends from the first side face to the second side face. An opening to the bore is at the first side face. The fastener has a transition portion between a bolt stem and a bolt head. The transition portion is fitted to the opening. The guide pin is attached to the fastener.

According to another embodiment, a disc brake assembly may comprise, individually and/or in combination, one or more of the following features: an anchor bracket having a receiving bore, wherein the receiving bore has an anchor bracket center line. A brake caliper having a lug, a bore, a fastener, and a guide pin. The lug has first and second side faces. The bore extends from the first side face to the second side face. The first face has an opening to the bore and the opening has a brake caliper center line. The fastener has a transition portion fitted to the opening to align the fastener with the brake caliper center line. The guide pin is attached to the fastener and extends into the receiving bore. The brake caliper center line intersects the anchor bracket center line at an angle.

According to another embodiment, a disc brake assembly may comprise, individually and/or in combination, one or more of the following features: a brake caliper having first and second lugs, first and second bores, first and second fasteners, and first and second guide pins. The first lug has first and second side faces and the second lug has third and fourth side faces. The first bore extends from the first side face to the second side face and the second bore extends from the third side face to the fourth side face. The first bore has a first axial profile at the first side face and the second bore has a second axial profile at the third side face. The first fastener, in the first bore, has a first brake caliper center line and a first transition portion fitted to the first axial profile. The second fastener, in the second bore, has a second brake caliper center line and a second transition portion fitted to the second axial profile. The first guide pin is attached to the first fastener and aligned with the first brake caliper center line. The second guide pin is attached to the second fastener and is aligned with the second brake caliper center line. An anchor bracket has first and second receiving bores. The first receiving bore has a first anchor bracket center line at a first offset from the first brake caliper center line. The first offset locates the first guide pin at a first controlled position in the first receiving bore. The second receiving bore has a second anchor bracket center line at a second offset from the second brake caliper center line. The second offset locates the second guide pin at a second controlled position in the second receiving bore.

An advantage of an embodiment is reduced deflection and/or translation of the disc brake assembly. Other advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
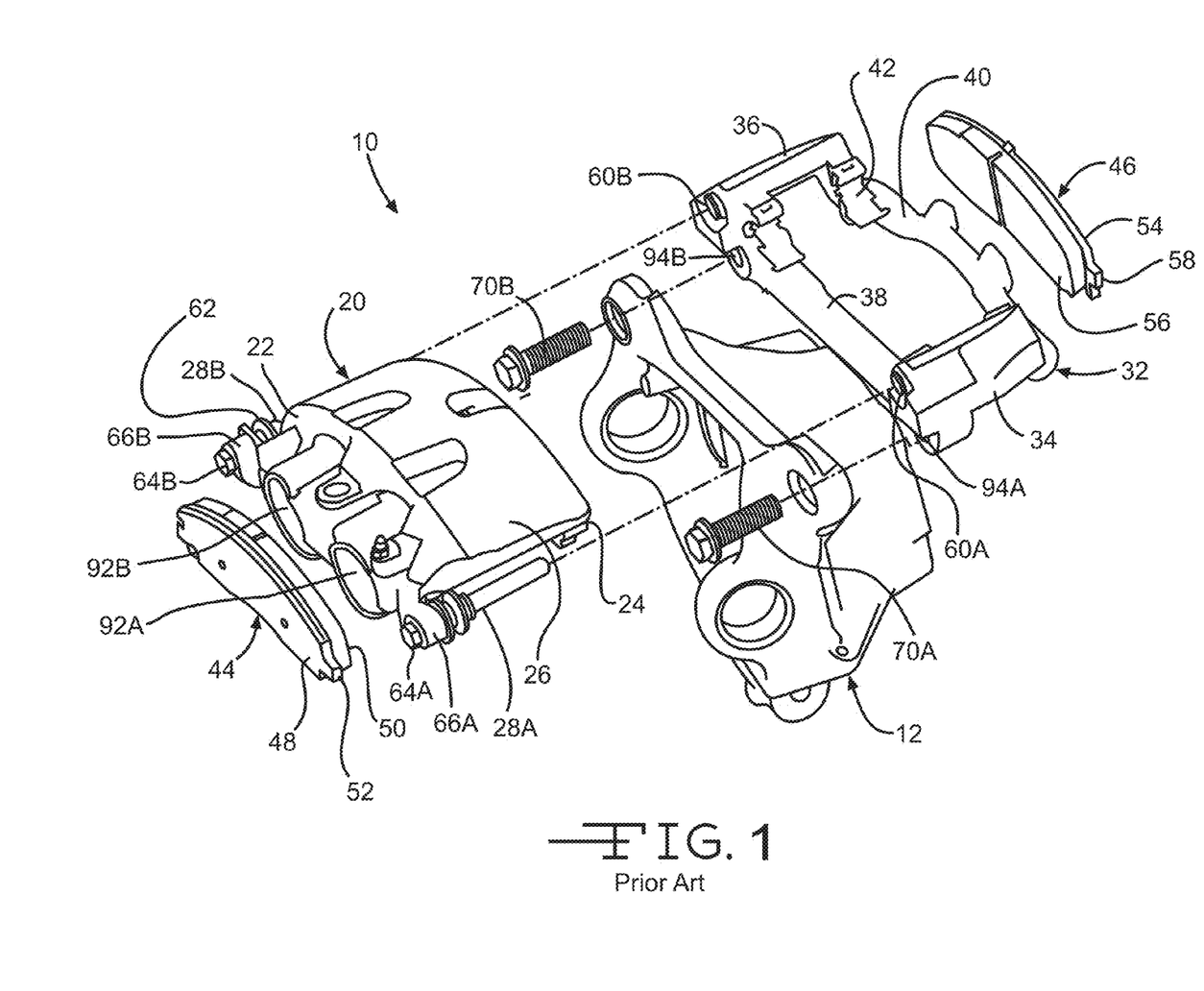
FIG. 1 is an exploded perspective view of a portion of a prior art disc brake assembly.

Referring now to the drawings, there is illustrated in FIG. 1, a portion of a prior art vehicle disc brake assembly, indicated generally at 10, with a knuckle, indicated generally at 12. The general structure and operation of the prior art disc brake assembly 10 is conventional in the art. For example, the prior art disc brake assembly 10 may be as disclosed in U.S. Patent Publication No. 2014/0231191 to Morais et al., the disclosure of which is incorporated herein by reference in entirety.

The prior art disc brake assembly 10 is a pin guided or pin sliding type of disc brake assembly and includes a generally C-shaped caliper, indicated generally at 20. The caliper 20 includes an inboard leg portion 22 and an outboard leg portion 24 which are interconnected by an intermediate bridge portion 26. As will be discussed in detail, the caliper 20 is secured to a pair of guide pins 28A and 28B which are slidably supported on an anchor bracket, indicated generally at 32. The anchor bracket 32 is, in turn, secured to a stationary component of the vehicle by suitable fasteners, such as for example bolts 70A and 70B, which are configured to be disposed in threaded openings 94A and 94B provided in the anchor bracket 32. Such a stationary component can be, for example, the steering knuckle 12, when the prior art disc brake assembly 10 is installed for use on the front of the vehicle, or can be, for example, an axle flange or drum-in-hat adapter (not shown), when the prior art disc brake assembly 10 is installed for use on the rear of the vehicle.

In the illustrated embodiment, the anchor bracket 32 includes a pair of axially and outwardly extending arms 34 and 36. The arms 34 and 36 are interconnected at their inboard ends by an inner tie bar 38 and are interconnected at their outboard ends by an outer tie bar 40. The arms 34 and 36 each have a pair of generally C-shaped channels formed thereon and a clip 42 installed in each of the channels. The clips 42 are provided to slidably support an inboard brake shoe, indicated generally at 44, and an outboard brake shoe, indicated generally at 46, thereon.

In the illustrated embodiment, the inboard brake shoe 44 includes a backing plate 48 and a friction pad 50. The inboard backing plate 48 includes opposed ends having tabs or protrusions 52 formed thereon, for supporting the inboard brake shoe 44 in the clips 42 installed in the channels of the anchor bracket 32. Alternatively, the tabs 52 may be omitted or a different bearing component known to those skilled in the art may be used. For example, pins may be used instead of the tabs 52. The outboard brake shoe 46 includes a backing plate 54 and a friction pad 56. The outboard backing plate 54 includes opposed ends having tabs or protrusions 58 formed thereon, for supporting the outboard brake shoe 46 in the clips 42 installed in the channels of the anchor bracket 32. Alternatively, the inboard brake shoe 44 can be supported on a brake piston/pistons (not shown) of the prior art disc brake assembly 10, and/or the outboard brake shoe 46 can be supported on the outboard leg portion 24 of the caliper 20, if so desired.

An actuation means is provided for effecting the operation of the prior art disc brake assembly 10. For the prior art disc brake assembly 10, the actuation means includes a pair of brake pistons (not shown) each of which is disposed in a first and second counterbore or recess 92A and 92B, respectively, formed in the inboard leg 22 of the caliper 20. The actuation means may be of a suitable type known to those skilled in the art. For example, the actuation means may be hydraulic, electrical, pneumatic, or mechanical types.

As shown in FIG. 1, each of the guide pins 28A and 28B are disposed in a non-threaded bore 60A and 60B, respectively, provided in each of the arms 34 and 36 of the anchor bracket 32. A boot seal 62 may be installed in each of the openings provided in the caliper 20 through which each of the guide pins 28A and 28B extend. A pair of threaded fasteners 64A and 64B are provided to secure the guide pins 28A and 28B, respectively, to the caliper 20. The guide pins 28A and 28B slidably secure the caliper 20 to the anchor bracket 32. The fasteners 64A and 64B extend through openings provided in lugs 66A and 66B, respectively, of the caliper 20 and are installed in an internally threaded bore 68 (illustrated in FIG. 2), provided inside each guide pin 28A and 28B, respectively.

Figure 2:
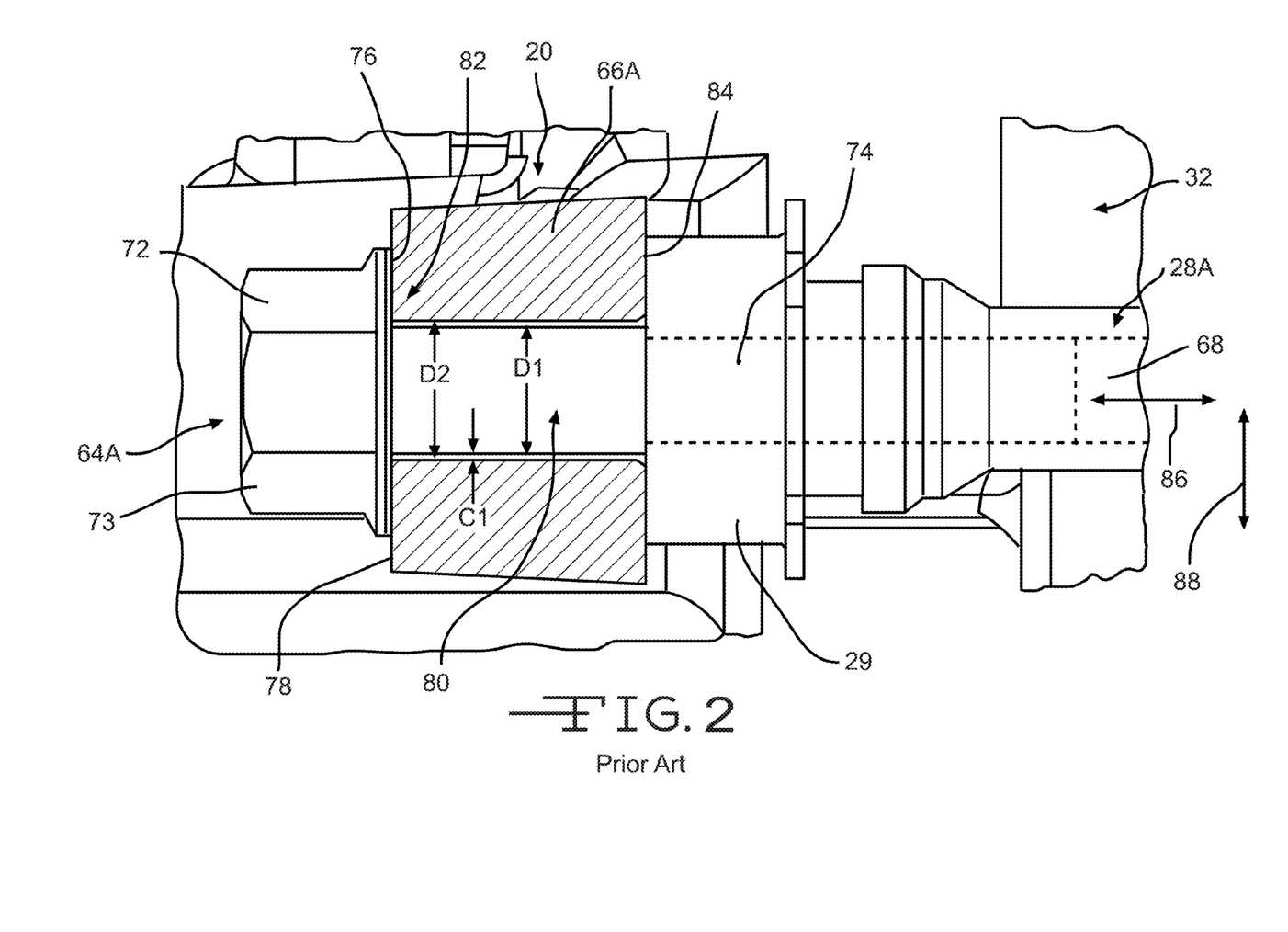
FIG. 2 is a sectional view through a portion of the prior art disc brake assembly illustrated in FIG. 1.

Referring now to prior art FIG. 2, there is illustrated in detail the slidable attachment of the brake caliper 20 to the anchor bracket 32 by the guide pin 28A and the fastener 64A. As will be readily understood by one skilled in the art, although only the attachment of the pin 28A by the fastener 64A to the lug 66A is described and illustrated herein, the attachment of the pin 28B by the fastener 64B to the lug 66B is similar.

As shown in prior art FIG. 2, the fastener 64A comprises a bolt head 72 and an externally threaded bolt stem 74. The bolt head 72 has a hexagon shaped head portion 73 and an enlarged flange portion 76. The bore 80 provided in the lug 66A is a non-threaded or "smooth" bore. The bolt stem 74 is inserted through the bore 80 and then is screwed into the internally threaded bore 68 of the guide pin 28A. The bolt stem 74 is screwed into the internally threaded bore 68 until the flange portion 76 of the bolt head 72 "frictionally" engages a first side surface 78 of the lug 66A. At the same time, screwing the bolt stem 74 into the bore 68 causes an end portion 29 of the guide pin 28A to "frictionally" engages an opposite second side surface 84 of the lug 66A. The combination of the flange portion 76 engaging the first side surface 78 and the end portion 29 engaging the second side surface 84 secures the guide pin 28A to the lug 66A.

The bore 80 intersects the first side surface 78 at a corner, indicated generally at 82. The corner 82, defines an angle between the first side surface 78 and the bore 80 which is generally ninety degrees. Alternatively, although not illustrated as such, the corner 82 may be chamfered to improve insertion of the fastener 64A into the bore 80. The bolt stem 74 defines a first or inner diameter D1 and the bore 80 defines a second or outer diameter D2. The first diameter D1 is less than the second diameter D2 which results in a gap or clearance C1 between at least a portion of the bolt stem 74 and the bore 80. The clearance C1 remains after the flange portion 76 has engaged the first side surface 78 and the guide pin 28A has engaged the second side surface 84.

The guide pin 28A has a first or longitudinal axis 86 and a second or lateral axis 88 that is transverse (i.e., oriented ninety degrees) relative to the longitudinal axis 86. Thus, during braking, when a "lateral" force is applied to the guide pin 28A in a direction along the lateral axis 88, the bolt stem 74 laterally slips or moves within the bore 80 due to the clearance C1. The lateral force is sufficient to overcome the engagement between the flange portion 76 and the first end surface 78 and the end portion 29 and the second end surface 84 while the guide pin 28A remains secured to the lug 66A. A clamp load by the flange portion 76 on the first end surface 78 and the end portion 29 on the second end surface 84 remains substantially unchanged while the bolt stem laterally slips or moves within the bore 80.

Figure 3:
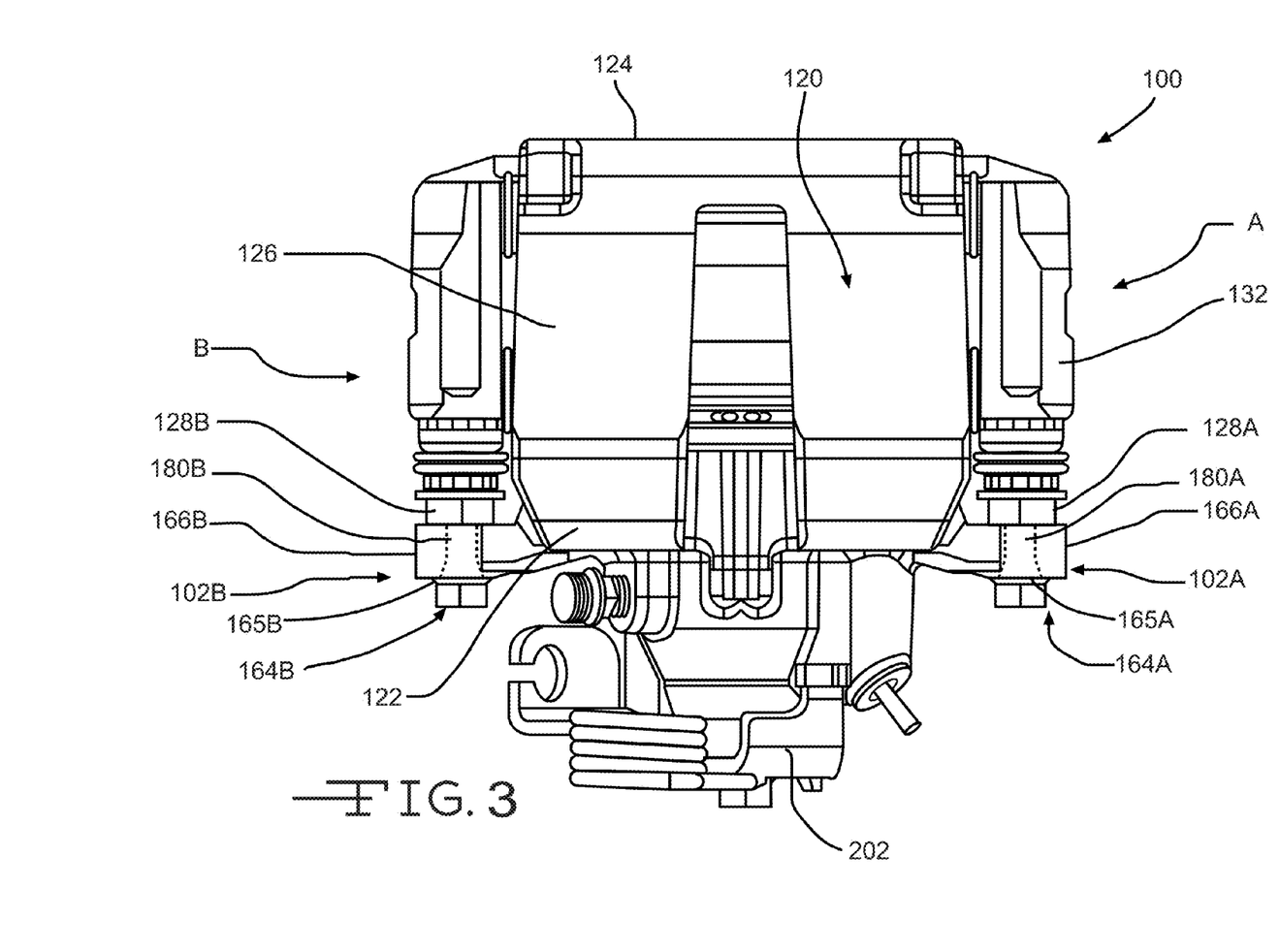
FIG. 3 is a top view of a first embodiment of a disc brake assembly in accordance with the present invention.
Figure 4:
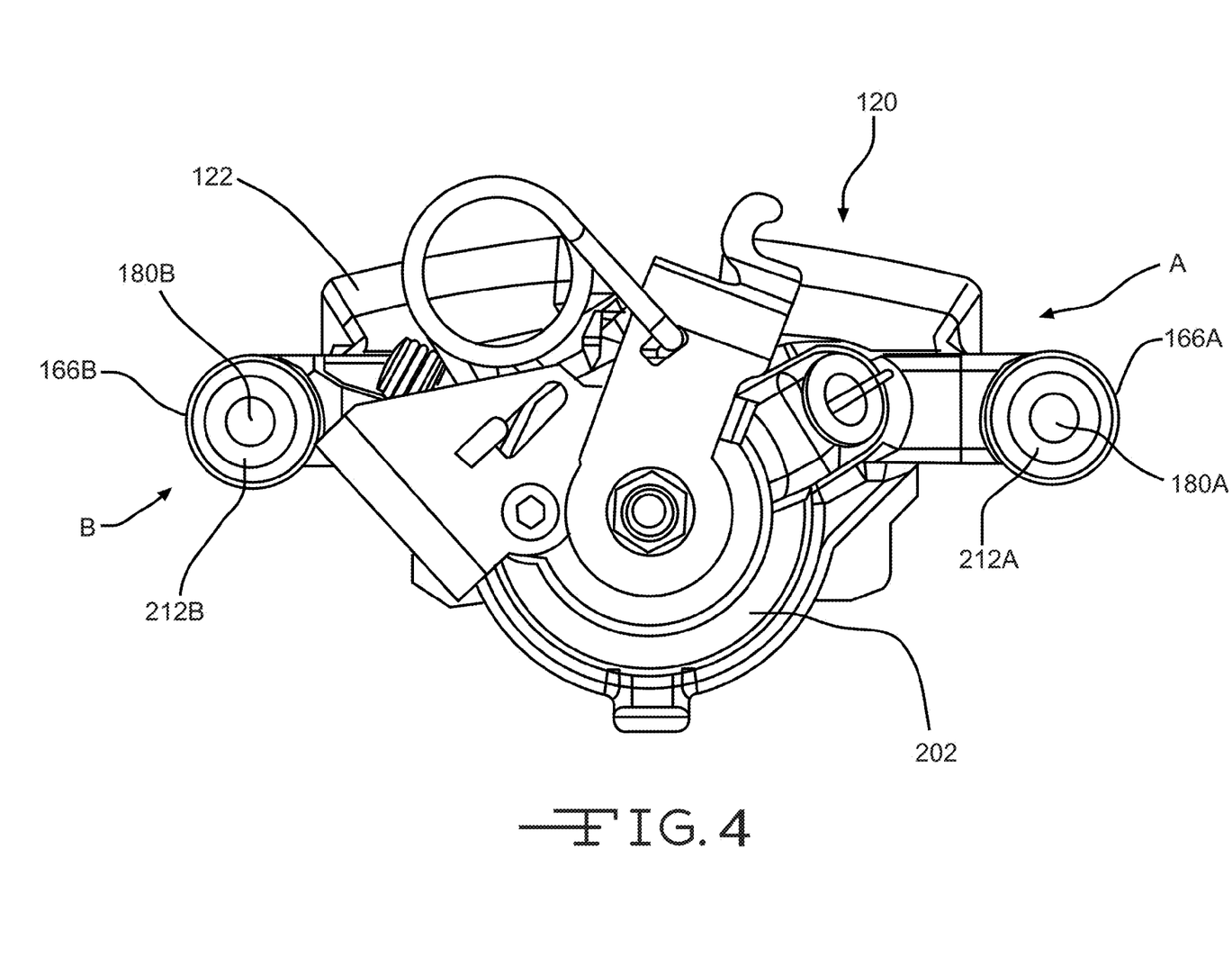
FIG. 4 is an end view of the disc brake assembly of FIG. 3.
Figure 5:
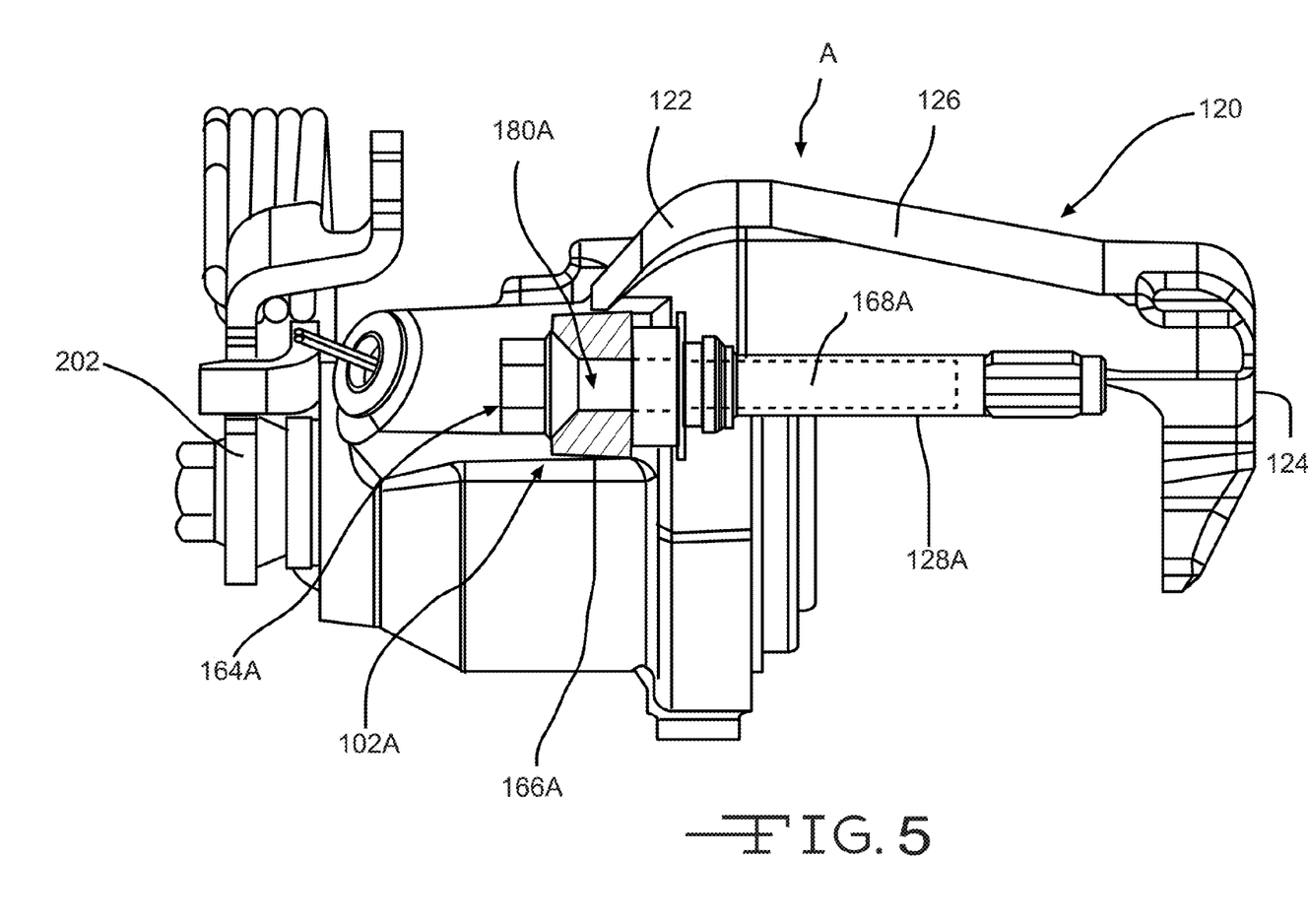
FIG. 5 is a side view of the disc brake assembly of FIG. 3.

Referring now to FIGS. 3-5, there is illustrated an embodiment of a disc brake assembly, indicated generally at 100, produced in accordance with the present invention. It should be noted that while this invention will be described in and illustrated in conjunction with the particular brake caliper structure disclosed herein, it will be appreciated that this invention may be used in conjunction with other brake caliper structures adapted for use in other kinds of vehicle disc brake assemblies. For example, the invention may be used in conjunction with non-opposed piston types of disc brake assemblies having one, or more than one, associated brake piston(s).

As will be readily understood by one skilled in the art, discussion of the disc brake assembly 100 includes a first or right hand side, indicated generally at A, and a second or left hand side, indicated generally at B. For discussion purposes, the discussion of a component(s) of the disc brake assembly 100 on the first side A applies to a corresponding component on the second side B unless otherwise noted and discussion of a component on the second side B applies to a corresponding component on the first side A unless otherwise noted.

The disc brake assembly 100 is a pin guided or pin sliding type of disc brake assembly and includes a generally C-shaped brake caliper, indicated generally at 120. The brake caliper 120 is adapted for use in a "Colette" type of disc brake assembly, such as that shown in U.S. Pat. No. 5,323,882 to Waterman et al. and U.S. Pat. No. Re 30,255 to Rath et al., the disclosures of both of these patents are herein incorporated by reference in entirety.

The brake caliper 120 includes an inboard leg portion 122 and an outboard leg portion 124 which are interconnected by an intermediate bridge portion 126. As will be discussed below in detail, the brake caliper 120 is secured to a pair of first and second guide pins 128A and 128B, respectively, which are conventional in the art and slidably supported on an anchor bracket, indicated generally at 132. The anchor bracket 132 is, in turn, secured to a stationary component of the vehicle by suitable fasteners (not shown). An actuation means 202 is provided for effecting the operation of the disc brake assembly 100. As illustrated, the actuation means 202 is a mechanical park brake mechanism. Alternatively, as readily understood by one skilled in the art, the actuation means 202 could be hydraulic. Suitable actuation means are known to those skilled in the art and include hydraulic, electrical, pneumatic, or mechanical means.

As shown in FIG. 3, a first threaded fastener 164A is provided to secure the first guide pin 128A to the brake caliper 120 and a second threaded fastener 164B is provided to secure the second guide pin 128B to the brake caliper 120. The first and second guide pins 128A and 128B slidably secure the brake caliper 120 to the anchor bracket 132. The first fastener 164A extends through an opening 165A provided in a first lug 166A of the brake caliper 120 and is installed in an internally threaded bore 168A (best illustrated in FIGS. 5 and 6 by hidden lines) provided inside the first guide pin 128A. The first lug 166A has a bore 180A and a profile 212A (to be discussed below in detail) and the second lug 166B has a bore 180B and a profile 212B (to be discussed below in detail).

Figure 6:
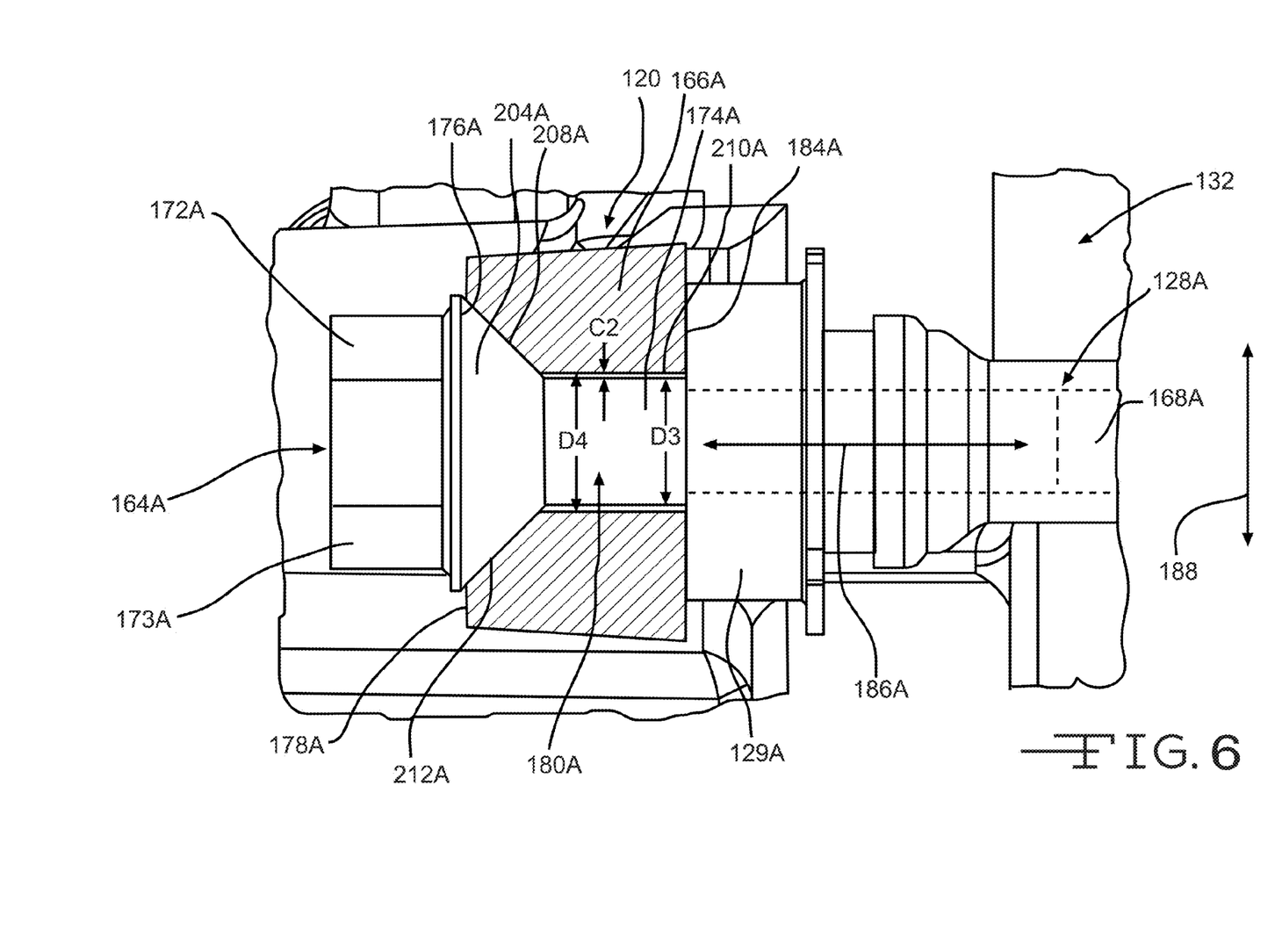
FIG. 6 is a partial sectional view of a portion of the first embodiment of the disc brake assembly illustrated in FIG. 3.

Referring now to FIG. 6, there is illustrated in detail the attachment of the brake caliper 120 to the anchor bracket 132 by the first guide pin 128A and the first fastener 164A. As will be readily understood by one skilled in the art, although only the attachment of the first guide pin 128A by the first fastener 164A to the first lug 166A is described and illustrated herein, the attachment of the second guide pin 128B by the second fastener 164B to the second lug 166B is similar.

As shown in FIG. 6, the first fastener 164A comprises a bolt head 172A and a partially externally threaded bolt stem 174A. The bolt head 172A has a hexagon shaped head portion 173A and an enlarged flange portion 176A. The bore 180A provided in the first lug 166A is a non-threaded or "smooth" bore. The bolt stem 174A is inserted through the bore 180A and then is screwed into the internally threaded bore 168A of the first guide pin 128A. Between the flange portion 176A of the bolt head 172A and the bolt stem 174A is a transition portion 204A. The first bore 180A comprises a first bore portion 208A and a second bore portion 210A. The first bore portion 208A connects a first side surface 178A of the first lug 166A to the second bore portion 210A and the second bore portion 210A connects the first bore portion 208A to a second side surface 184A. The first bore portion 208A acts as an opening to the first bore 180A from the first side surface 178A.

The bolt stem 174A is screwed into the internally threaded bore 168A until the transition portion 204A "frictionally" engages the first bore portion 208A. At the same time, screwing the bolt stem 174A into the bore 168A causes an end portion 129A of the first guide pin 128A to be moved or pulled to the left in the figure so as to "frictionally" engage the opposite second side surface 184A of the first lug 166A. The combination of the transition portion 204A engaging the first bore portion 208A and the end portion 129A engaging the second side surface 184A is operative to secure the first guide pin 128A to the first lug 166A.

The transition portion 204A is fitted to the profile 212A of the first bore portion 208A. The profile 212A is annularly about an axis of the first bore 180A. The first bore portion 208A may be symmetrical about the axis of the first bore 180A. Alternatively, the profile 212A may vary or be asymmetrical about the first bore portion 208A. At least a portion of the transition portion 204A and the first bore portion 208A both have the profile 212A. As used herein, "fitted" means an interface between the transition portion 204A and the first bore portion 208A substantially without clearance, air gaps, or free or void space between the transition portion 204A and the first bore portion 208A. Fitted together, the transition portion 204A abuts the first bore portion 208A. The profile 212A of the first bore portion 204A may be a hypotenuse of a triangle formed between the bolt stem 174A and first bolt head 172A—i.e., the profile may be cone-shaped (as illustrated). Alternatively, the profile 212A may be bowl-shaped, concave, convex, or otherwise non-linear. Alternatively, the profile 212A may be angled relative to an inner surface of the first bore 180A. Alternatively, the profile 212A may be any suitable profile as desired by one skilled in the art. For example, the transition portion 204A may have a profile different than the profile 212A. For example, the transition portion 204A may be bowl-shaped while the profile 212A is cone-shaped.

The bolt stem 174A defines a third or inner diameter D3 and the bore 180A defines a fourth or outer diameter D4. The third diameter D3 is less than the fourth diameter D4 which results in a gap or clearance C2 between the bolt stem 174A and the bore 180A. The clearance C2 remains after the flange portion 176A has engaged the first side surface 178A and the guide pin 128A has engaged the second side surface 184A.

The first guide pin 128A has a first or longitudinal axis 186A and a second or lateral axis 188 that is transverse (i.e., oriented ninety degrees) relative to the longitudinal axis 186A. Thus, during braking, when a "lateral" force is applied to the guide pin 128A in a direction along the lateral axis 188, the bolt stem 174A is prevented from laterally slipping or moving within the bore 180A due to the transition portion 204A being fitted to the first bore portion 208A.

Figures 7A, 7B:
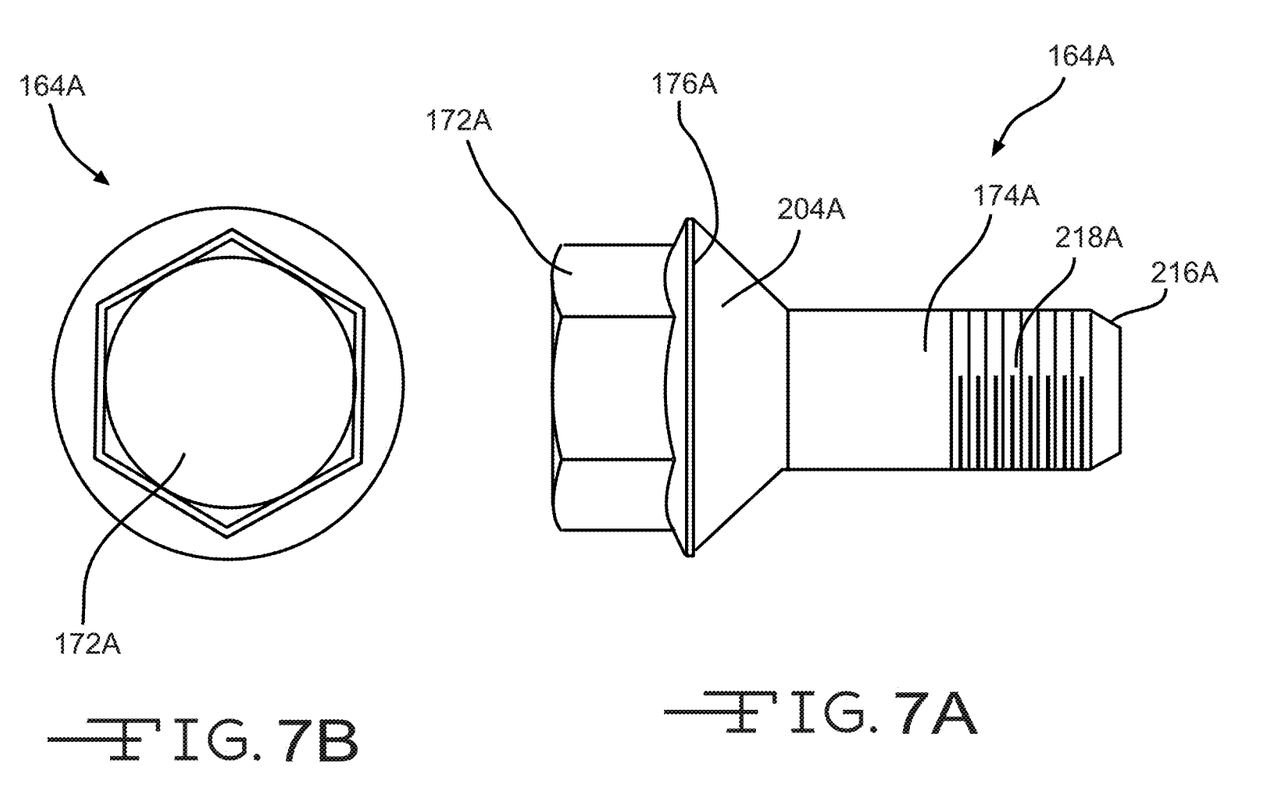
FIG. 7A is a side view of a guide pin fastener best illustrated in FIG. 6.
FIG. 7B is an end view of the guide pin fastener.

Referring now to FIGS. 7A and 7B, there is illustrated the first fastener 164A. The bolt stem 174A has a tapered end 216A and an externally threaded section 218A directly adjacent thereto. The threaded section 218A threadably mates with the internally threaded bore 168A for attaching the first guide pin 128A.

Figure 8A:
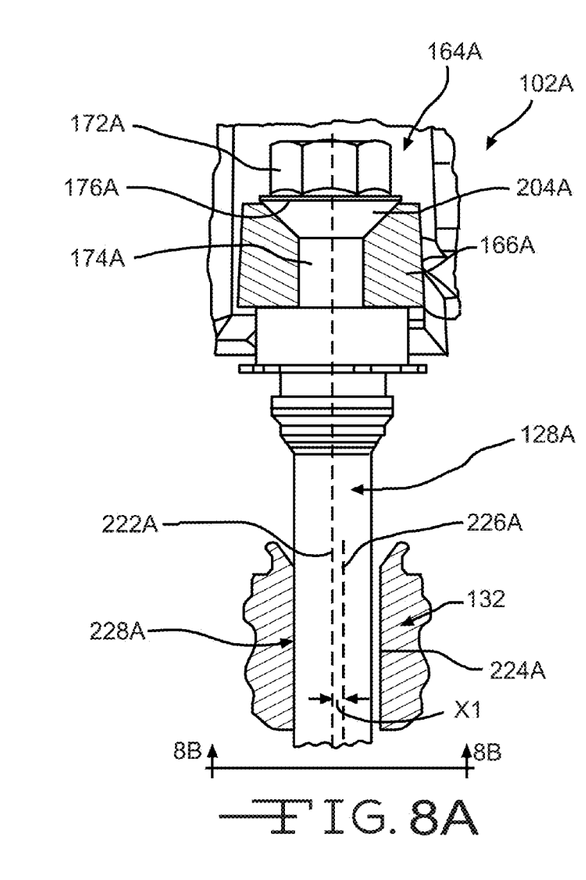
FIG. 8A is a partial sectional view of a portion of the first embodiment of the disc brake assembly.
Figure 8B:
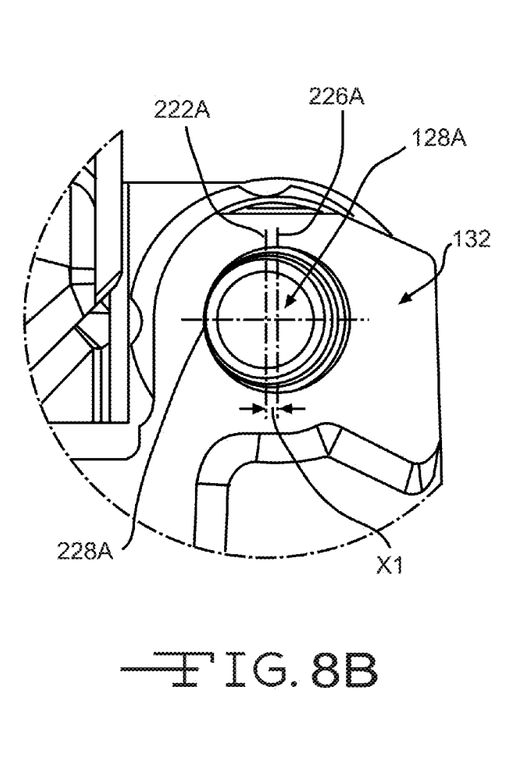
FIG. 8B is an end view of the disc brake assembly illustrated in FIG. 8A.

Referring now to FIGS. 8A-9B, there is illustrated a first "controlled" positioning of the first guide pin 128A in the bracket 132. The first fastener 164A and first guide pin 128A define a "common" brake caliper center line 222A. The bracket 132 has a first receiving bore 224A which defines a bracket center line 226A. As shown in FIGS. 8A and 8B, the brake caliper center line 222A is offset by a first horizontal offset distance X1 from the bracket center line 226A such that the first guide pin 128A contacts the first receiving bore 224A at a first "controlled" point of engagement therewith, indicated generally at 228A. As a result of this, by increasing or decreasing the distance X1, the first "controlled" position 228A may be placed at different positions within the first receiving bore 224A. For example, the first guide pin 128A may be varied between leading and trailing positions.

Figure 9A:
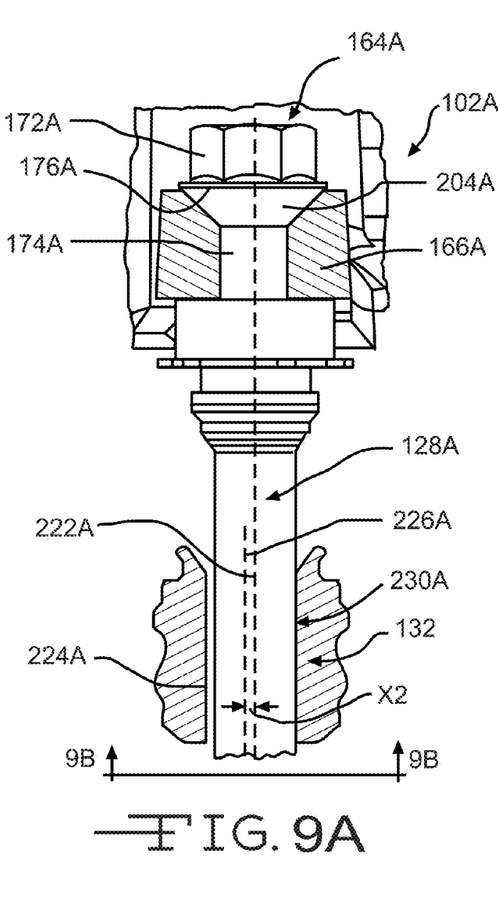
FIG. 9A is a partial sectional view of a portion of the first embodiment of the disc brake assembly.
Figure 9B:
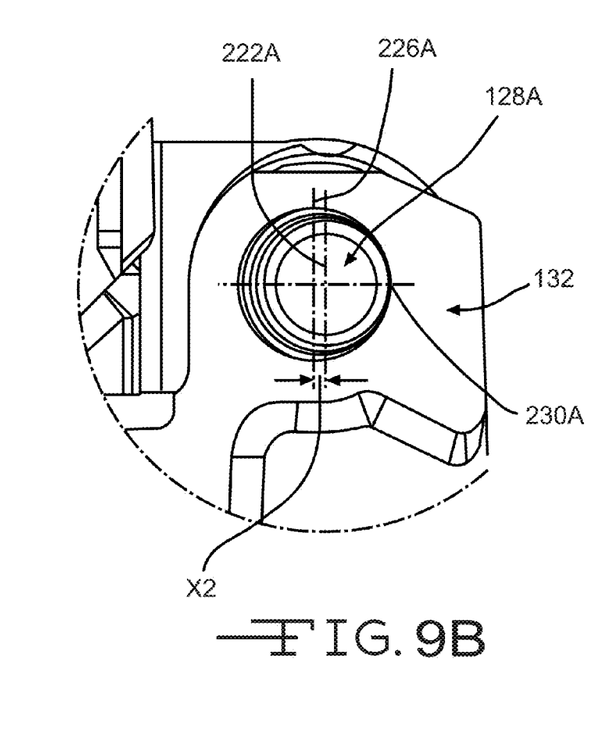
FIG. 9B is an end view of the disc brake assembly illustrated in FIG. 9A.

The brake caliper center line 222A is variable in three dimensions by adjusting the profile 212A. Adjusting the profile 212A "aims" the brake caliper center line 222A, as well as the guide pin 128A, into the first receiving bore 224A. For example, as illustrated in FIGS. 9A and 9B the brake caliper center line 222A and the bracket center line 226A center line are separated by a second offset horizontal distance X2 such that the first guide pin 128A contacts the first receiving bore 224A at a second "controlled" point of engagement therewith, indicated generally at 230A. The second distance X2 may be different from the first distance X1 such that the first "controlled" position 228A is different than the second "controlled" position 230A. The first receiving bore 224A may use the first distance X1 and a second receiving bore for the second guide pin 124B may use the second distance X2.

Figure 10A:
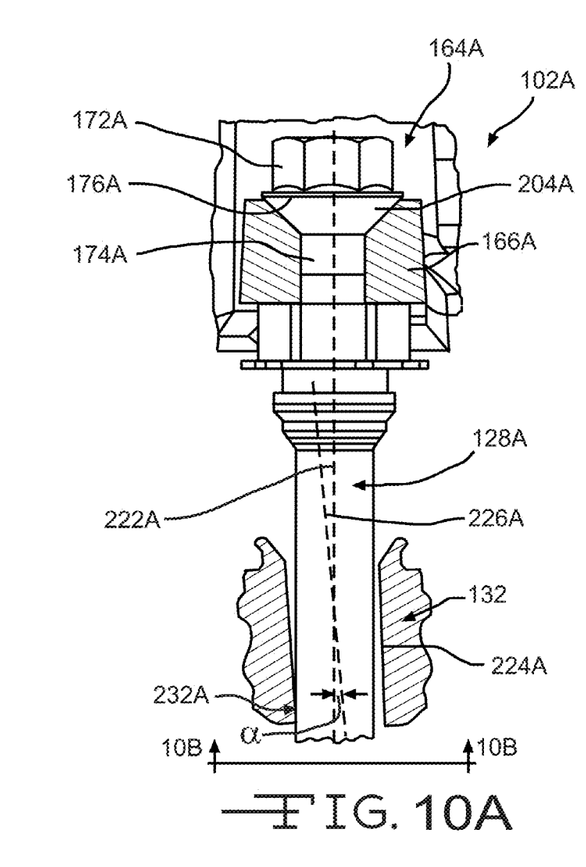
FIG. 10A is a partial sectional view of a portion of the first embodiment of the disc brake assembly.
Figure 10B:
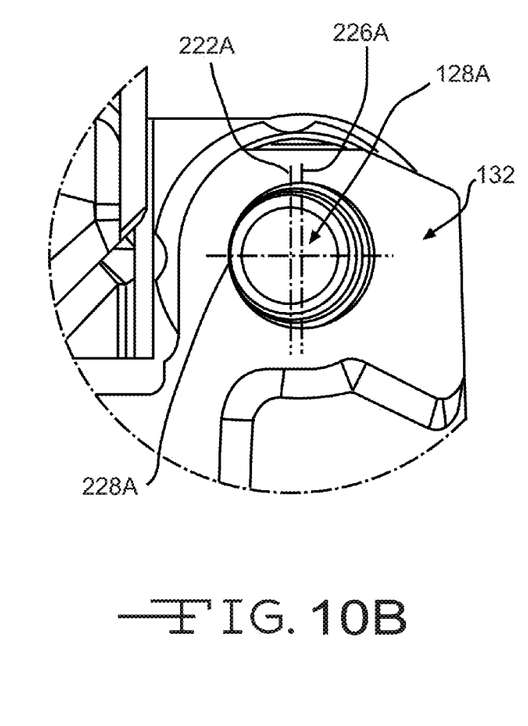
FIG. 10B is an end view of the disc brake assembly illustrated in FIG. 10A.

Alternatively, as illustrated in FIGS. 10A and 10B, the brake caliper center line 222A and the bracket center line 226A may intersect at an angle α such that the first guide pin 128A contacts the first receiving bore 224A at a third "controlled" point of engagement therewith, indicated generally at 232A. The brake caliper center line 222A and the bracket center line 226A may intersect at different angles for each of the first receiving bore 224A and the second receiving bore.

Alternatively, the first guide pin 128A may be "aimed" in three dimensions into the first receiving bore 224A by varying the profile 212A. For example, the profile 212A may be asymmetrical with a shallow profile portion opposite a steep profile portion. The steep profile portion is closer to the first axis 186A than the shallow profile portion. The brake caliper center line 222A of the fastener 164A inserted through the bore 180A having the steep and shallow profile portions is directed away from the shallow profile side of the bore 180A and towards the steep profile side. The example is exemplary and the steep and shallow profile portions need not be opposite.

As will be readily understood by one skilled in the art, the brake caliper 120 may have a first guide pin 128A attached in accordance with the present invention and an additional guide pin that is conventionally attached.

Figure 11:
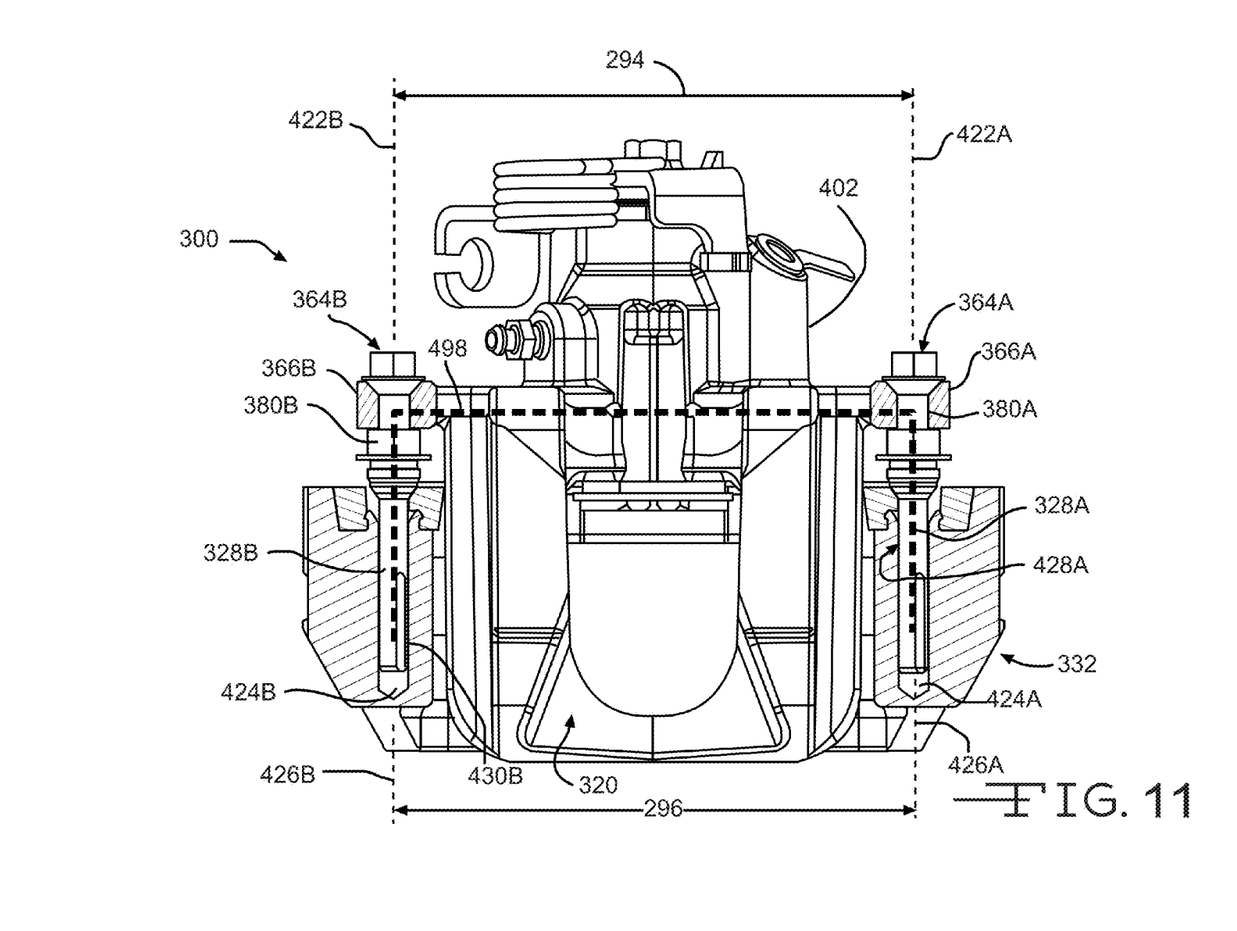
FIG. 11 is a top view of a second embodiment of a disc brake assembly in accordance with the present invention.

Referring now to FIG. 11, there is illustrated a second embodiment of a disc brake assembly, indicated generally at 300, produced in accordance with the present invention. Because the disc brake assembly 300 is a variation of the disc brake assembly 100 of FIGS. 3-10B, like reference numerals, increased by 200, designate corresponding parts in the drawings and detailed description thereof will be omitted.

As shown in FIG. 11, an anchor bracket 332 is cutaway to illustrate first and second guide pins 328A and 328B, respectively. Because first and second fasteners 364A and 364B, respectively, reduce translation and/or deflection of the first and second guide pins 328A and 328B, respectively, in first and second bores 380A and 380B, respectively, there is a path 498 through a brake caliper 320 that acts as a tie bar to increase stiffness of the anchor bracket 332. Increasing the stiffness of the bracket assembly 332 reduces joint slippage between the bracket assembly 332 and a knuckle (not shown) to which the bracket assembly 332 is attached using a suitable method known to those skilled in the art.

An advantage of the disc brake assembly 300 is the first fastener 364A is fitted to the first bore 180A and the second fastener 364B is fitted to the second bore 180B. As a result, a pin span 294 between the first and second brake caliper center lines 422A and 422B, respectively, is set and maintained. A receiving bore span 294 is between the first and second bracket center lines 426A and 426B, respectively. As illustrated, the pin span 294 is less than the receiving bore span 296. Alternatively, the pin span 294 may be greater than or equal to the receiving bore span 296. Alternatively, the first brake caliper center line 422A may be co-linear with, or offset inwardly or outwardly from, the first bracket center line 426A and/or the second brake caliper center line 422B may be co-linear with, or offset inwardly or outwardly from, the second bracket center line 426B.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A disc brake assembly comprising:
   a brake caliper having
      a lug with first and second side faces,
      a bore extending from the first side face to the second side face,
      a cone-shaped opening to the bore at the first side face,
      a fastener having a cone-shaped transition portion between a bolt stem and a bolt head, wherein the transition portion is fitted to the opening in direct contact therewith, and
      a guide pin attached to the fastener.

2. The disc brake assembly of claim 1 wherein the opening is asymmetrical.

3. The disc brake assembly of claim 1 wherein the transition portion is fitted to the opening substantially without gaps between the transition portion and the opening.

4. The disc brake assembly of claim 1 further comprising:
   a receiving bore in an anchor bracket supported on the guide pin, wherein the transition portion is fitted to the opening to locate the guide pin at a controlled position in the receiving bore.

5. The disc brake assembly of claim 1 wherein the transition portion is fitted to the opening to restrain the guide pin from lateral movement.

6. The disc brake assembly of claim 1 wherein the transition portion is fitted to the opening to rigidly connect the fastener to the brake caliper.

7. A disc brake assembly comprising:
   an anchor bracket having a receiving bore, wherein the receiving bore has an anchor bracket center line; and
   a brake caliper having
      a lug, wherein the lug has first and second side faces,
      a bore extending from the first side face to the second side face, wherein the first face has a cone-shaped opening to the bore and the opening has a brake caliper center line,
      a fastener, wherein the fastener has a cone-shaped transition portion fitted to the opening in direct contact therewith and aligns the fastener with the brake caliper center line, and
      a guide pin attached to the fastener and extending into the receiving bore, wherein the brake caliper center line intersects the anchor bracket center line at an angle.

8. The disc brake assembly of claim 7 wherein the guide pin is restrained from lateral movement by the transition portion being fitted to the opening.

9. The disc brake assembly of claim 7 wherein the guide pin contacts the receiving bore at a first controlled position.

10. The disc brake assembly of claim 7 wherein the anchor bracket has a second receiving bore and the brake caliper has a second guide pin attached to a second fastener, wherein the second fastener is fitted to a second opening of the brake caliper and the second guide pin contacts the second receiving bore at a second controlled position.

11. The disc brake assembly of claim 10 wherein the bores are rigidly connected by an inboard leg of the brake caliper.

12. The disc brake assembly of claim 7 wherein the transition portion is fitted to the opening substantially without gaps between the transition portion and the opening.

13. A disc brake assembly comprising:
   a brake caliper having
      a first lug with first and second side faces,
      a first bore extending from the first side face to the second side face and having a first axial profile at the first side face,
      a first fastener, in the first bore, having a first brake caliper center line and a first transition portion fitted to the first axial profile,
      a first guide pin attached to the first fastener and aligned with the first brake caliper center line,
      a second lug with third and fourth side faces,
      a second bore extending from the third side face to the fourth side face and having a second axial profile at the third side face,
      a second fastener, in the second bore, having a second brake caliper center line and a second transition portion fitted to the second axial profile, and
      a second guide pin attached to the second fastener and aligned with the second brake caliper center line; and
   an anchor bracket having
      a first receiving bore with a first anchor bracket center line at a first offset from the first brake caliper center line, wherein the first offset locates the first guide pin at a first controlled position in the first receiving bore, and
      a second receiving bore with a second anchor bracket center line at a second offset from the second brake caliper center line, wherein the second offset locates the second guide pin at a second controlled position in the second receiving bore.

14. The disc brake assembly of claim 13 wherein the first transition portion is fitted to the first axial profile to restrain the first guide pin from lateral movement and the second transition portion is fitted to the second axial profile to restrain the second guide pin from lateral movement.

15. The disc brake assembly of claim 13 wherein the first axial profile extends into the first bore from the first side face and the second axial profile extends into the second bore from the third side face.

16. The disc brake assembly of claim 13 wherein the first controlled position is oriented differently within the first receiving bore than the second controlled position within the second receiving bore.

17. The disc brake assembly of claim 13 wherein the first brake caliper center line and the first receiving bore center line intersect at a first angle and the second brake caliper center line and the second receiving bore center line intersect at a second angle.

18. The disc brake assembly of claim 13 wherein the first transition portion is fitted to the first axial profile substantially without gaps between the first transition portion and the first bore and the second transition portion is fitted to the second axial profile substantially without gaps between the second transition portion and the second bore.

19. The disc brake assembly of claim 13 wherein the first and second bores are rigidly connected by an inboard leg of the brake caliper.

\* \* \* \* \*